United States Patent
Grimm et al.

(10) Patent No.: US 7,118,366 B2
(45) Date of Patent: Oct. 10, 2006

(54) PROTECTIVE DEVICE FOR AN INJECTION UNIT TO GUARD AGAINST INJURY

(75) Inventors: Günther Grimm, Hilgertshausen (DE); Friedrich Staudacher, Eichenau (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 448 days.

(21) Appl. No.: 10/768,392

(22) Filed: Jan. 30, 2004

(65) Prior Publication Data
US 2004/0224045 A1    Nov. 11, 2004

(30) Foreign Application Priority Data
Jan. 31, 2003  (DE) ................................ 103 04 118
Mar. 26, 2003  (DE) ................................ 103 18 826

(51) Int. Cl.
*B29C 45/84* (2006.01)
(52) U.S. Cl. ................................ 425/151; 425/DIG. 45
(58) Field of Classification Search ................ 425/151, 425/DIG. 45
See application file for complete search history.

(56) References Cited

U.S. PATENT DOCUMENTS 3,621,533 A * 11/1971 Bertrandi .................... 425/151
3,635,628 A    1/1972 Cook, Jr.

FOREIGN PATENT DOCUMENTS

| DE | 21 41 814 A   | 6/1972 |
| DE | 36 30 416 A1  | 3/1987 |
| JP | 59 007026 A   | 1/1984 |
| JP | 08025415 A    | 1/1996 |

* cited by examiner

Primary Examiner—Tim Heitbrink
(74) Attorney, Agent, or Firm—Henry M. Feiereisen

(57) ABSTRACT

A protective device for an injection unit of an injection molding machine includes a protective plate which is disposed at an outlet port of a channel of an injection nozzle. The protective plate is moveable between a shielding position, in which the outlet port is covered, and an opening position, in which the outlet port is cleared. Moving the protective plate between the shielding and opening positions is a mechanical switching mechanism which is disposed outside the channel and applies an adjusting force which acts between the protective plate and a molding tool, when the injection unit docks on the molding tool.

19 Claims, 2 Drawing Sheets

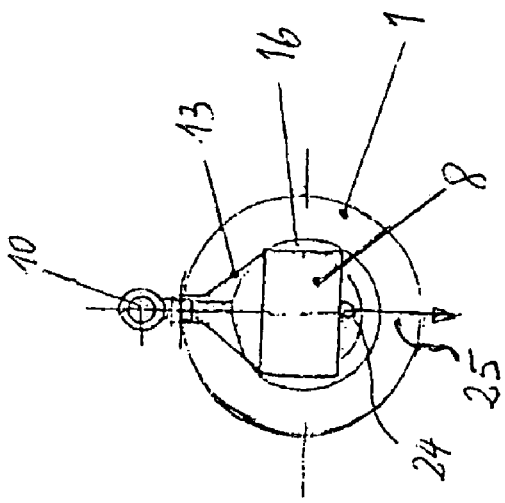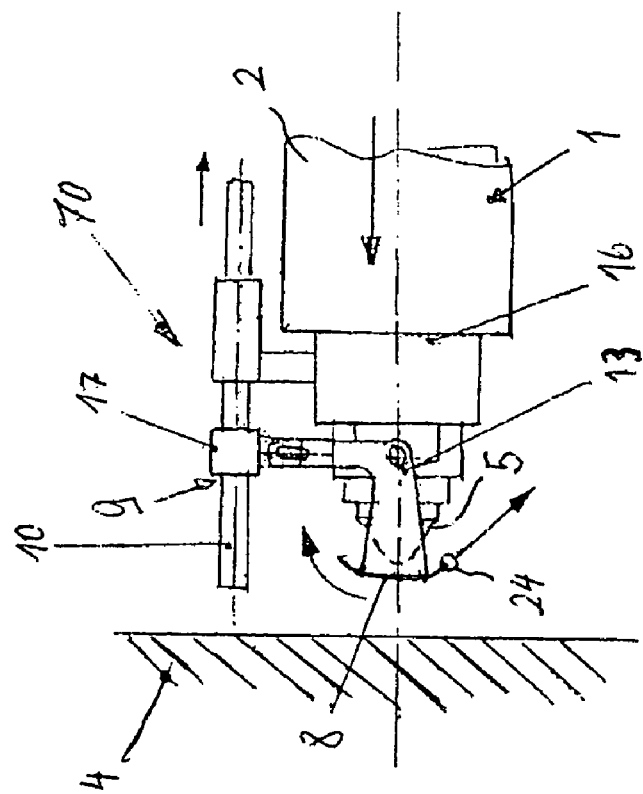

PROTECTIVE DEVICE FOR AN INJECTION UNIT TO GUARD AGAINST INJURY

CROSS-REFERENCES TO RELATED APPLICATIONS

This application claims the priority of German Patent Applications, Serial Nos. 103 04 118.4, filed Jan. 31, 2003, and 103 18 826.6, filed Mar. 26, 2003, pursuant to 35 U.S.C. 119(a)–(d), the disclosure of which is incorporated herein by reference.

BACKGROUND OF THE INVENTION

The present invention relates to a protective device for an injection unit of an injection molding machine.

An injection unit of a type involved here is part of an injection molding machine and typically includes a plasticizing cylinder which produces plastic melt for injection via an injection nozzle into a molding tool. When the injection unit is detached from the molding tool, there is a risk that personnel, working in proximity of the injection unit of the injection molding machine, get injured by squirting hot molding compound that may spew uncontrollably out of the injection nozzle because of a gas bubble formation or thermal expansion of the molding compound in the plasticizing cylinder or because of malfunction of the process sequence.

To address this risk of injury, a protective system has been proposed which includes a pneumatically or hydraulically operated protective flap which is disposed immediately in front of the outlet port of the injection nozzle. The protective flap swings upwards into an opening position for clearing the injection nozzle by means of pneumatic or hydraulic actuators through intervention of controlled proximity switches, as soon as the injection unit has reached during advancement a defined position at the molding tool. Conversely, the flap can be moved into a shielding position for covering the outlet port of the injection nozzle as soon as the injection unit leaves the defined position during a return stroke. This type of protective system is complex in structure and is prone to malfunction because of the series connection of different system components such as an electric proximity circuit, hydraulic or pneumatic actuators, and a mechanical flap kinematics.

Japanese patent publication JP-A-08 025 415 discloses an injection unit with a protective device having a spring-loaded nozzle tip which includes a nozzle channel and is coupled with a shut-off valve via an operating stem extending through the nozzle channel. The shut-off valve is disposed on the inlet side of the nozzle channel and loaded by a spring force to seek the closed disposition. When impacting the funnel-shaped gate of the molding tool, the nozzle tip is pushed back in opposition to the spring force to operate the shut-off valve. This type of protective device suffers many process-based shortcomings. Numerous molding compounds trap gas in the plasticizing cylinder as a result of degradation to develop gas bubbles which are unable to escape to the outside, when the injection unit is uncoupled, because the shut-off valve is closed. Thus, these gas bubbles migrate during the injection stage together with the molding compound into the molding tool, adversely affecting the quality of the injection-molded article or even leading to a rejection of the injection-molded article. There is a further problem of this protective device relating to the closure of the nozzle channel on the inlet side. After injection of a shot, remaining molding compound in the nozzle channel cannot be removed by molding compound subsequently pressed from the plasticizing cylinder because the shut-off valve has assumed the closed position. Thus, remaining molding compound may solidify and ultimately form a plug closure which can migrate into the mold cavity during the next shot so that the quality of the injection molded article is again adversely affected or a malfunction of the valve operation may even be experienced.

It would therefore be desirable and advantageous to provide an improved protective device which obviates prior art shortcomings and which does neither adversely affect the injection molding process nor the nozzle channel geometry.

SUMMARY OF THE INVENTION

According to one aspect of the present invention, a protective device for an injection unit of an injection molding machine, includes a protective plate disposed at an outlet port of an injection channel of an injection nozzle and moveable between a shielding position, in which the outlet port is covered and an opening position, in which the outlet port is cleared, and a mechanical switching mechanism, disposed outside the injection channel, for applying an adjusting force which acts between the protective plate and a molding tool, when the injection unit docks the molding tool.

The present invention resolves prior art problems by providing a protective device which operates independently from external forces, purely mechanical, and which has only few components that are all disposed outside the injection nozzle. As a result, the protective device operates highly reliable and independently on the configuration of the nozzle channel. The flow behavior of the injection nozzle and in particular the cross sectional profile of the nozzle channel can thus be best suited to the process, without regard to the installation of the protective device. The protective device according to the present invention can be used universally and allows also installation in existing injection units, regardless of the nozzle type.

According to another feature of the present invention, the protective plate and the switching mechanism may be commonly arranged on a carrier which is swingably mounted on the injection unit. In this way, a later installation of the protective device according to the invention is facilitated. Moreover, the surface area of the molding tool that cooperates with the switching mechanism during docking stage of the injection unit can be freely chosen beforehand.

According to another feature of the present invention, the switching mechanism may include a finger-shaped tracer which is moveable in linear direction in opposition to an advancement direction of the injection unit, when the tracer strikes against a touch surface of the molding tool during the docking stage of the injection unit at the molding tool, wherein the touch surface is located outside a gate opening of the molding tool. As a result, the switching mechanism has a configuration which especially enhances the kinematics. Although the configuration of the switching mechanism with a finger-shaped tracer is a currently preferred embodiment, it is, of course, conceivable to configure other, purely mechanically actuatable constructions of the switching mechanism. For example, the finger-shaped tracer may be substituted by a toothed rack which cooperates with a pinion.

According to yet another feature of the present invention, the protective plate and the switching mechanism may be constructed such that they automatically move into the shielding position. Suitably, the switching mechanism may hereby be spring-biased for seeking the shielding position. Thus, the protective device has an enhanced safety feature. As an alternative, a weight member may be attached to the protective plate for urging the protective plate to seek the shielding position by gravitational force, when no other force acts on the switching mechanism. However, the provision of a spring-biased switching mechanism is a currently preferred embodiment.

According to still another feature of the present invention, the protective plate may be convexly arched in exit direction of the injection nozzle and swingably arranged on the injection unit. As a result, the movement of the protective plate is easy to control and reliably provides protection. Suitably, the switching mechanism may have an adjustable switch point to enable a sensitive response behavior.

According to still another feature of the present invention, position sensors may be provided for monitoring a switched position of the protective plate.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a schematic fragmentary illustration of an injection unit for an injection molding machine in an area of the nozzle end with another embodiment of a protective device according to the present invention; and FIG. 4 is a front view of the protective device and the injection unit of FIG. 3.

DETAILED DESCRIPTION OF PREFERRED EMBODIMENTS

Figure 1:
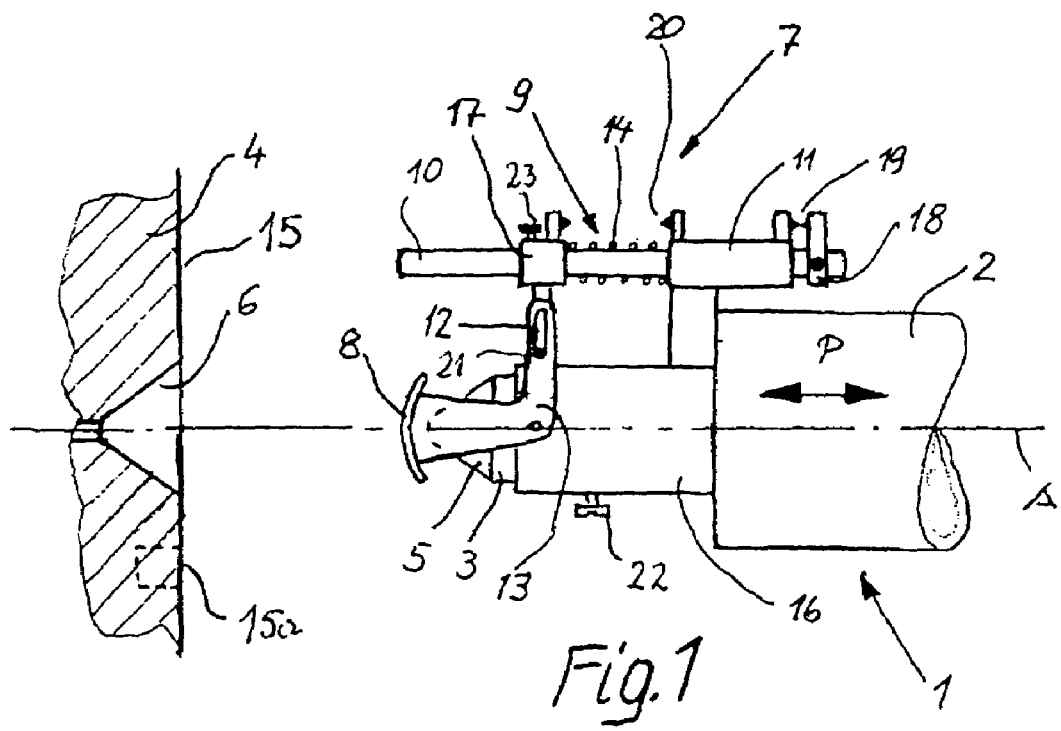
FIG. 1 is a schematic fragmentary illustration of an injection unit for an injection molding machine in an area of the nozzle end with a protective device according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic fragmentary illustration of an injection unit, generally designated by reference numeral 1 and forming part of an injection molding machine which is not shown in more detail for sake of simplicity. The injection unit 1 defines a central axis A and includes a plasticizing cylinder 2 which is linearly movable in a direction indicated by arrow P and shown here only in the area of the injection end. The plasticizing cylinder 2 terminates in an injection nozzle 3 having an inner injection channel ending in a nozzle tip 5. When the injection unit 1 docks a molding tool 4, the nozzle tip 5 engages a complementary gate opening 6 of the molding tool 4 for subsequent injection of a shot of molding compound from the plasticizing cylinder 2 via the injection nozzle 3 into the molding tool 4. Construction and operation of an injection unit 1 is generally known to a person skilled in the art so that a further description thereof is omitted for the sake of simplicity.

After injecting the molding compound into the molding tool 4, the injection unit 1 moves backwards. To prevent during return stroke of the injection unit 1 a formation of gas bubbles or thermal volume enlargement of the molding compound in the plasticizing cylinder 2 as a result of degradation, or to prevent uncontrolled spewing of hot molding compound from the injection nozzle 3 to the outside, as a result of a malfunction in the process sequence, a novel and inventive protective device, generally designated by reference numeral 7, is provided for interaction with the injection nozzle 3.

Figure 2:
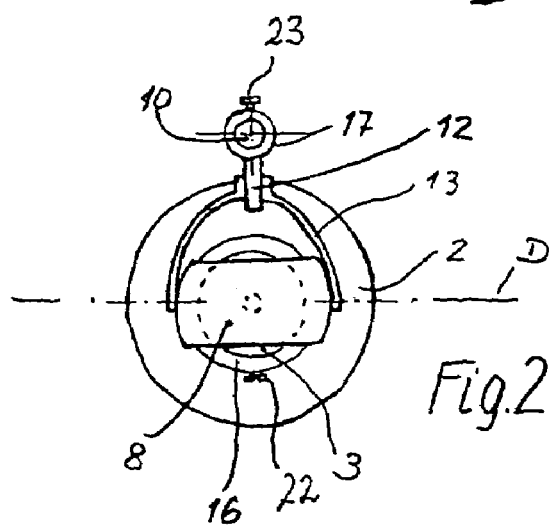
FIG. 2 is a front view of the protective device and the injection unit of FIG. 1.

The protective device 7 includes a convex, generally circular arc shaped protective plate 8 which is mounted to the injection unit 1 for rotation about a pivot axis D (FIG. 2), which is oriented perpendicular to the axis A. The protective plate 8 is thus swingable between a shielding position, shown in FIG. 1, in which the protective plate 8 is disposed in front of the nozzle tip 5 in immediate proximity to the outlet port of the nozzle channel to thereby cover the outlet port, and an opening position, in which the nozzle channel is cleared. Movement of the protective plate 8 between these two end positions is realized by a switching mechanism, generally designated by reference numeral 9. The switching mechanism 9 is of purely mechanical construction and includes a finger-shaped tracer 10 which is movably accommodated in a guide sleeve 11 and extends in parallel relationship to the axis A of the injection unit 1. The tracer 10 is coupled to the free lever end of a pivot lever 13 via a slotted guide mechanism with an oblong hole 12 in the pivot lever 13 and a pin 21 operatively connected to the tracer 10 and received in the oblong hole 12. A compression spring 14 loads the switching mechanism 9 to seek the shielding position of the protective plate 8.

The protective device 7 operates as follows: When the injection unit 1 docks the molding tool 4, the tracer 10 strikes against a touch surface 15 of the molding tool 4 and is hereby moved in an axial direction in the guide sleeve 11 in opposition to the spring force of the compression spring 14, thereby swinging the protective plate 8 via the slotted guide mechanism upwards to assume the opening position. Thus, the outlet port of the injection nozzle 3 is fully open. As soon as the injection unit 4 moves away from the molding tool 4, the protective plate 8 is moved by the spring force back to the shielding position, as shown in FIG. 1, to cover the outlet port of the nozzle tip 5.

The switching mechanism 9 is disposed together with the protective plate 8 on a carrier 16 so that the entire protective device 7 can be mounted later as a unitary structure for retrofitting an existing injection unit. The carrier 16 and thus the entire protective device 7 can be secured to the injection unit 1 at any rotational orientation and secured by a fastening screw 22. In addition, the effective length of the tracer 10 between the forward tracer end and the oblong hole 12 of the slotted guide mechanism and thus the switch point of the protective device 7 can be adjustably set by a switch member 17, which is longitudinally moveably arranged on the tracer 10 and securable by a suitable fastening screw 23, and an end stop 18. Thus, different geometries, in particular structural heights of the injection nozzle 3 or of the tool touch surface 15 can be compensated. The tracer 10 may, for example, easily be adjusted to cooperate with a flank area as touch surface 15a on the molding tool 4, as indicated by dash line in FIG. 1.

Referring now to FIGS. 3 and 4, there is shown another embodiment of a protective device, generally designated by reference numeral 70, for use in an injection unit 1 an injection molding machine. Parts corresponding with those in FIG. 1 are denoted by identical reference numerals and not explained again. The description below will center on the differences between the embodiments. In this embodiment, provision is made for a weight member 24 instead of a compression spring 14. The weight member 24 is attached to the protective plate 8 for urging the protective plate 8 to seek the shielding position by gravitational force, as indicated by the arrow 25, when no other force acts on the switching mechanism 9.

Supervision of the switched position of the protective plate 8 may be realized by arranging position sensors 19, 20, which may be implemented, for example, in the form of electric switching contacts and provided between the guide sleeve 11 and the switch member 17 as well as between the guide sleeve 11 and the end stop 18, as shown in FIG. 1.

The protective device 7 can be used for all applications, including production process that involves the use of an injection nozzle which maintains contact with the injection mold between two injection operations. In other words, the protective device 7 is universally applicable and affords a uniform safety level, also for injection units with injection nozzles controlled by needle valves so that there is no need for maintaining the needle valve actively closed for safety reasons, when and as soon as the injection unit is disengaged from the molding tool.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A protective device for an injection unit of an injection molding machine, comprising:
   a proctive plate disposed at an outlet port of an nozzle channel of an injection nozzle and moveable between a shielding position, in which the outlet port is covered, and an opening position, in which the outlet port is cleared; and
   a mechanical switching mechanism, disposed outside the injection channel, for applying an adjusting force on the protective plate to move the protective plate from the shielding position to the opening position, when the injection unit docks with a molding tool.

2. The protective device of claim 1, and further comprising a carrier swingably mounted onto the injection unit for allowing attachment of the carrier in different rotary positions, wherein the protective plate and the switching mechanism are commonly arranged on the carrier.

3. The protective device of claim 1, wherein the switching mechanism includes a finger-shaped tracer which is moveable in a linear direction in opposition to an advancement direction of the injection unit, whereby when the tracer strikes against a touch surface of the molding tool, the injection unit docks with a gate opening of the molding tool.

4. The protective device of claim 1, wherein the protective plate and the switching mechanism are constructed to spontaneously seek the shielding position.

5. The protective device of claim 4, wherein the switching mechanism is spring-biased for so loading the protective plate as to seek the shielding position.

6. The protective device of claim 4, and further comprising a weight member attached to the protective plate for urging the protective plate to seek the shielding position by gravitational force.

7. The protective device of claim 1, wherein the protective plate is configured in the form of a substantially circular arc defined by a circle center point and is swingably arranged on the injection unit for movement about the circle center point.

8. The protective device of claim 1, wherein the switching mechanism has an adjustable switch point.

9. The protective device of claim 1, and further comprising position sensors for monitoring a switched position of the protective plate.

10. An injection molding machine, comprising:
    a molding tool;
    an injection unit having a plasticizing cylinder for producing a plastic melt, and a nozzle connected to the plasticizing cylinder and having a nozzle channel for expelling the plastic melt into a cavity of the molding tool; and
    a protective device for guarding against splashing of plastic melt, said protective device including a protective plate disposed at an outlet port of the nozzle channel and moveable between a shielding position, in which the outlet port is covered, and an opening position, in which the outlet port is cleared, and a mechanical switching mechanism, disposed outside the nozzle channel and rendered operative to move the protective plate between the shielding and opening positions in response to the injection unit touching the molding tool.

11. The injection molding machine of claim 10, wherein the protective device includes a carrier swingably mounted onto the injection unit for allowing attachment of the carrier in different rotary positions, wherein the protective plate and the switching mechanism are commonly arranged on the carrier.

12. The injection molding machine of claim 10, wherein the switching mechanism includes a finger-shaped tracer which is moveable in a linear direction in opposition to an advancement direction of the injection unit, whereby when the tracer strikes against a confronting touch surface of the molding tool, the injection unit docks with a gate opening of the molding tool.

13. The injection molding machine of claim 10, wherein the switching mechanism is spring-biased for so loading the protective plate as to spontaneously seek the shielding position.

14. The injection molding machine of claim 10, wherein the protective device includes a weight member attached to the protective plate for urging the protective plate to seek the shielding position by gravitational force.

15. The injection molding machine of claim 10, wherein the protective plate is configured in the form of a substantially circular arc defined by a circle center point and is swingably arranged on the injection unit for movement about the circle center point.

16. The injection molding machine of claim 12, wherein the switching mechanism includes a pivot lever which operatively connects the tracer to the protective plate.

17. The injection molding machine of claim 16, wherein the pivot lever is operatively connected to the tracer via a slotted guide mechanism.

18. The injection molding machine of claim 17, wherein the switching mechanism includes a switch member movably arranged on the tracer to allow adjustment of an effective length of the tracer between a forward tracer end and the slotted guide mechanism.

19. The injection molding machine of claim 10, wherein the protection device includes position sensors for monitoring a switched position of the protective plate.

* * * * *

UNITED STATES PATENT AND TRADEMARK OFFICE
CERTIFICATE OF CORRECTION

| | | |
|---|---|---|
| PATENT NO. | : 7,118,366 B2 | Page 1 of 1 |
| APPLICATION NO. | : 10/768392 | |
| DATED | : October 10, 2006 | |
| INVENTOR(S) | : Günther Grimm et al. | |

It is certified that error appears in the above-identified patent and that said Letters Patent is hereby corrected as shown below:

<u>Column 5, line 47:</u>  Change "proctive" to --protective--

Signed and Sealed this

Sixteenth Day of January, 2007

JON W. DUDAS
*Director of the United States Patent and Trademark Office*